(12) United States Patent
Leyendecker et al.

(10) Patent No.: US 11,157,427 B2
(45) Date of Patent: Oct. 26, 2021

(54) CONFIGURABLE METHOD TO ASSOCIATE DRIVE SLOT TO BUS NUMBER

(71) Applicant: Dell Products L.P., Round Rock, TX (US)

(72) Inventors: Robert R. Leyendecker, Austin, TX (US); Rui An, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/812,024

(22) Filed: Mar. 6, 2020

(65) Prior Publication Data
US 2021/0279193 A1    Sep. 9, 2021

(51) Int. Cl.
*G06F 13/00* (2006.01)
*G06F 13/20* (2006.01)
*G06F 13/42* (2006.01)

(52) U.S. Cl.
CPC .......... *G06F 13/20* (2013.01); *G06F 13/4282* (2013.01); *G06F 2213/0026* (2013.01)

(58) Field of Classification Search
CPC ...... G06F 13/00; G06F 13/20; G06F 13/4282; G06F 2213/0026
See application file for complete search history.

(56) References Cited

U.S. PATENT DOCUMENTS

| | | | |
|---|---|---|---|
| 8,443,114 B2* | 5/2013 | Lambert | G06F 3/0605 710/13 |
| 2015/0067226 A1* | 3/2015 | Iskandar | G06F 13/4031 710/309 |

* cited by examiner

*Primary Examiner* — Tim T Vo
*Assistant Examiner* — Kim T Huynh
(74) *Attorney, Agent, or Firm* — Jackson Walker L.L.P.

(57) ABSTRACT

An information handling system may include a basic input/output system (BIOS), a management controller configured to provide out-of-band management of the information handling system, a plurality of communications bus root complex ports, and a storage backplane having a plurality of slots configured to receive respective storage resources. The information handling system may be configured to: store, at the management controller, an initial data structure containing a correspondence between the plurality of communications bus root complex ports and the plurality of slots; transmit, from the BIOS to the management controller, information regarding bus numbers for a plurality of enumerated information handling resources coupled to the communications bus; and determine, by the management controller, a correspondence between the bus numbers and the plurality of slots.

14 Claims, 2 Drawing Sheets

CONFIGURABLE METHOD TO ASSOCIATE DRIVE SLOT TO BUS NUMBER

TECHNICAL FIELD

The present disclosure relates in general to information handling systems, and more particularly to determining associations between physical drive slots and bus numberings for information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many difficulties exist in the field of identifying the physical locations of information handling resources. For example, a server information handling system may have a large number of physical storage resources attached thereto. The correspondence between a logical identifier such as a bus number and a physical identifier such as a drive slot number may be difficult to determine. It is desirable to know such a correspondence, however, for various tasks relating to system management.

Consider the case of an information handling system having one or more CPUs, PCIe root complexes, NVMe backplanes, and a management controller such as a Baseboard Management Controller (BMC). For the purposes of NVMe storage, NVMe/PCIe lanes can be routed from each CPU root complex to a mainboard connector, via a cable from the mainboard connector to a backplane connector, and finally from the backplane connector to a backplane drive slot. For any given mainboard in a family of products, this same path may or may not be utilized between the root complex port and the drive slot. For example, the path routing may change based on sizing, cost, complexity, signal integrity constraints, cable lengths, etc.

This presents a problem for end user management, because ultimately an operating system or computer management service may need to know which physical drive to target with control and status transactions. However, a PCIe bus number may have no physical representation within the system. So it would be desirable for any computer system to be able to relate the physical drive slot number to the PCIe bus number across a large number of distinct routing and cable topologies.

Existing solution and implementations typically require that the system keep separate tables of topology in the BIOS and the backplane, and a BMC may pass information in between. But this implementation may have several problems. For example, a change in topology would require changes in both the BIOS and backplane firmware. This may result in defects, delays, and extra test time due to the complex programming needing to be supported.

Existing designs may also not be capable of accommodating the update of such stored tables dynamically at manufacturing time or development time, instead requiring a whole new firmware revision. Further, existing designs may simply not be feasible on some platforms.

It should be noted that for the sake of concreteness and exposition, this disclosure discusses in detail the situation of PCIe/NVMe devices. One of ordinary skill in the art with the benefit of this disclosure will appreciate its applicability to other bus technologies, etc.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with determining associations between physical drive slots and bus numberings may be reduced or eliminated.

In accordance with embodiments of the present disclosure, an information handling system may include a basic input/output system (BIOS), a management controller configured to provide out-of-band management of the information handling system, a plurality of communications bus root complex ports, and a storage backplane having a plurality of slots configured to receive respective storage resources. The information handling system may be configured to: store, at the management controller, an initial data structure containing a correspondence between the plurality of communications bus root complex ports and the plurality of slots; transmit, from the BIOS to the management controller, information regarding bus numbers for a plurality of enumerated information handling resources coupled to the communications bus; and determine, by the management controller, a correspondence between the bus numbers and the plurality of slots.

In accordance with these and other embodiments of the present disclosure, a method may include in an information handling system comprising a basic input/output system (BIOS), a management controller configured to provide out-of-band management of the information handling system, a plurality of communications bus root complex ports, and a storage backplane having a plurality of slots configured to receive respective storage resources: storing, at the management controller, an initial data structure containing a correspondence between the plurality of communications bus root complex ports and the plurality of slots; transmitting, from the BIOS to the management controller, information regarding bus numbers for a plurality of enumerated information handling resources coupled to the communications bus; and determining, by the management controller, a correspondence between the bus numbers and the plurality of slots.

In accordance with these and other embodiments of the present disclosure, an article of manufacture may include a non-transitory, computer-readable medium having computer-executable code thereon that is executable by a processor of a management controller of an information handling system for: storing an initial data structure containing a correspondence between a plurality of communications bus root complex ports of the information handling system and a plurality of slots of a storage backplane of the information handling system; receiving, from a basic input/output system (BIOS) of the information handling system, information regarding bus numbers for a plurality of enumerated information handling resources coupled to the communications bus; and determining a correspondence between the bus numbers and the plurality of slots.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
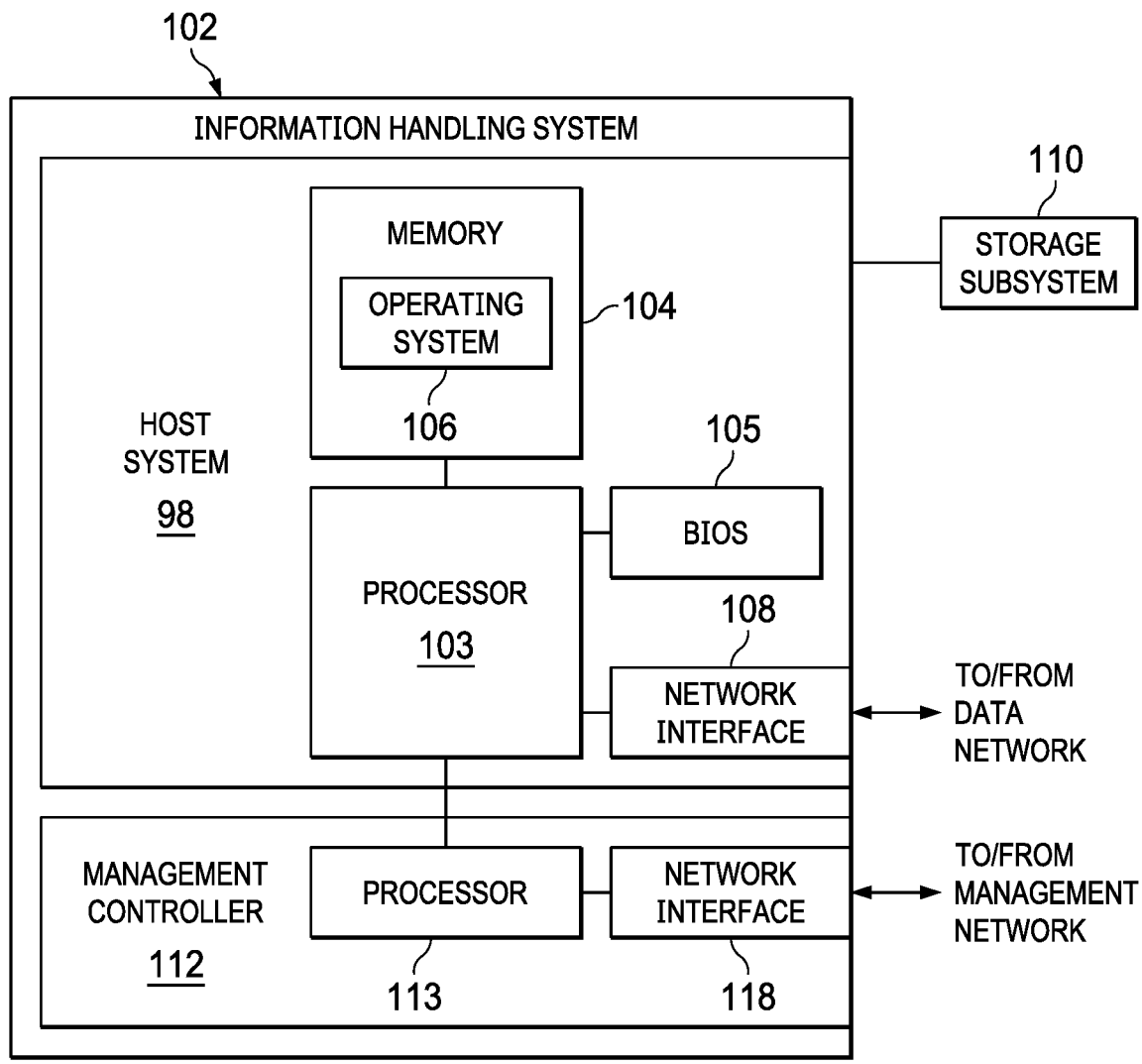
FIG. 1 illustrates a block diagram of an example information handling system, in accordance with embodiments of the present disclosure.
Figure 2:
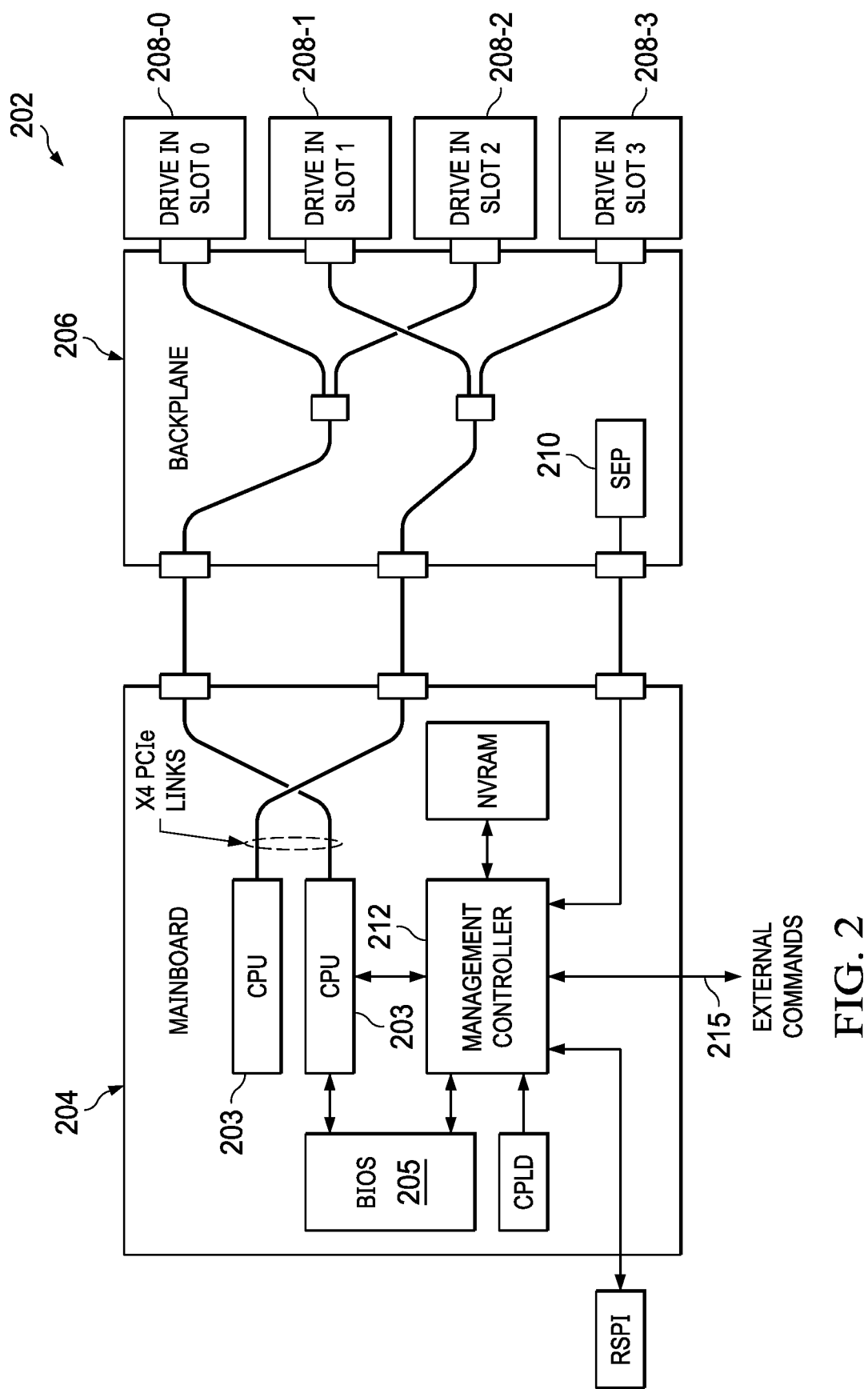
FIG. 2 illustrates a block diagram of an example information handling system, in accordance with embodiments of the present disclosure.

Preferred embodiments and their advantages are best understood by reference to FIGS. 1 through 2, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources" or simply "storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Additionally, information handling system 102 may be coupled to storage subsystem 110. In some embodiments, storage subsystem 110 may be an external drive enclosure including one or more storage resources therein. In other embodiments, storage subsystem 110 may be an integral part of information handling system 102. Storage subsystem may include one or more backplanes, each including one or more drive slots to which physical storage resources may be coupled.

Turning now to FIG. 2, another example information handling system 202 is shown. In FIG. 2, a mainboard 204 including two CPUs 203 is coupled via x4 PCIe links and suitable cabling to a backplane 206. In this embodiment, only a single backplane 206 is used, but as one of ordinary skill in the art with the benefit of this disclosure will appreciate, any desired number of backplanes 206 may be included.

Backplane 206 includes a storage enclosure processor (SEP) 210 as a component thereof. Backplane 206 may further include a plurality of drive slots 208 into which physical storage resources may be inserted. For example, drive slot 208-0 may correspond to a logical drive slot number 0; drive slot 208-1 may correspond to a logical drive slot number 1; drive slot 208-2 may correspond to a logical drive slot number 2; and drive slot 208-3 may correspond to a logical drive slot number 3.

For any combination of a mainboard 204 with a backplane 206, the root-complex port to backplane drive slot (e.g., the end-to-end physical PCIe lane routing, across boards and cables) may be known a priori at the time the system is designed. This mapping can be stored in a table within the firmware of management controller 212 (e.g., a BMC).

Such a table may accommodate CPU ports or ports which are part of a PCIe expander circuit. As an example designed to illustrate the flexibility of the approach, information handling system 202 may be designed with a complex CPU and bridge PCIe topology. Each CPU and bridge may be connected to a different drive slot. A backplane ID may be a unique identifier used to differentiate multiple backplanes in a storage subsystem. An example table is shown at Table 1 below.

TABLE 1

| Management Controller 212 Table | | | |
|---|---|---|---|
| PCIe Port Type | PCIe Port Number | Backplane ID | Backplane Drive Slot |
| CPU 0 | 0 | 1 | 3 |
| CPU 1 | 1 | 1 | 2 |
| Bridge 0 | 0 | 1 | 1 |
| Bridge 1 | 1 | 1 | 0 |

During initialization (power on) of information handling system 202, BIOS 205 may discover and enumerate various devices and PCIe buses found in the system. From this list of enumerated devices, BIOS 205 may determine CPU port types and port numbers (e.g., based on an agreed-upon encoding standard). Once the PCIe bus enumeration and encoding is complete, BIOS 205 may send the results to the management controller 212 via an IPMI command, shared memory, or any other suitable inter-processor communications interface. Table 2 below provides an example message payload that may be sent from BIOS 205 to management controller 212 in this embodiment.

TABLE 2

Message Payload from BIOS 205 to Management Controller 212

| PCIe Port Type | PCIe Port Number | PCIe Bus Number |
| --- | --- | --- |
| CPU 0 | 0 | 0x75 |
| CPU 1 | 1 | 0x43 |
| Bridge 0 | 0 | 0x12 |
| Bridge 1 | 1 | 0x13 |

Once management controller 212 receives the message payload specifying the relevant PCIe bus numbers, the binding association between PCIe bus numbers and drive slots may be completed. Management controller 212 may then return the binding between backplane ID, drive slot number, and PCIe bus number for use by other components of information handling system 202. Table 3 below provides an example message payload that may be sent from management controller 212 in this embodiment.

TABLE 3

Message Payload from Management Controller 212 to BIOS 205 (End-to-End Mapping)

| PCIe Port Type | PCIe Port Number | PCIe Bus Number | Backplane ID | Backplane Drive Slot |
| --- | --- | --- | --- | --- |
| CPU 0 | 0 | 0x75 | 1 | 3 |
| CPU 1 | 1 | 0x43 | 1 | 2 |
| Bridge 0 | 0 | 0x12 | 1 | 1 |
| Bridge 1 | 1 | 0x13 | 1 | 0 |

Once the end-to-end mapping has been determined, both management controller 212 and BIOS 205 can make the PCIe bus number to drive slot number mapping available to other system components such as operating systems and server management entities.

Programmatically, a method in accordance with embodiments of this disclosure may be described as follows.

First, a table is prepared with the mapping between PCIe ports and backplane drive slots for a given combination of platform configuration and backplane. This initial mapping table may be compiled into a firmware image for a management controller such as a BMC.

When the management controller boots, it may check NVRAM (or another suitable storage medium) for an existing copy of the table. If none exists, the mapping table is stored in NVRAM.

The management controller determines a Backplane ID for any attached backplanes by querying the respective backplane SEP via an I2C bus connection or any other suitable communications interface.

The management controller gets a Configuration ID from mainboard 204. This Configuration ID may be stored in one or more registers of a complex programmable logic device (CPLD) of mainboard 204, and it generally specifies which one of a number of possible configurations exists in the system.

Together, the Configuration ID and Backplane ID effectively form a unique key which can be used to look up the PCIe port to drive slot routing information for this particular mainboard/backplane combination.

The BIOS sends a list of PCIe port numbers and their associated PCIe bus numbers to the management controller.

The management controller then looks up the associated drive slot number for each port and returns this information to the BIOS.

At this point, both the management controller and the BIOS now have the full end-to-end PCIe bus number to drive slot mapping.

At some future time, the management controller's mapping table may need to be updated to accommodate a new configuration. External commands 215 (which may include IPMI, ConfigDB, a personality module (PM), and/or any other suitable server interface commands) may be used for this purpose. For example, this functionality may be used to provide a new table to the management controller (e.g., manually using IPMI tools, or in an automated fashion via a new PM, etc.).

Further, some systems may include a memory device to store information about the system such as a service tag number, system configuration information, management controller licensing information, etc. For example, such information may be stored in a restore Serial Peripheral Interface (rSPI) memory device on a front panel of the system. If such storage is available, the mapping table may be saved there, which may facilitate mainboard replacement in the field. For example, the mapping table may be stored to the rSPI device, the mainboard may be replaced, and then the mapping table may be re-loaded from the rSPI device.

Accordingly, embodiments of this disclosure may provide various advantages. For example, the problem of complex topologies may be addressed using a single management controller table shared by all interfaces. Such a table may store all configurations for a given platform (e.g., for a plurality of different potential information handling system configurations). Based on a unique combination of Backplane ID and CPLD Configuration ID, the management controller may select a particular configuration from the table that is associated with the actual configuration. The table may be updated in the field to support new storage architectures in some embodiments. Further, the table may be stored in persistent memory and recalled during mainboard replacement in some embodiments.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a basic input/output system (BIOS);
   a management controller configured to provide out-of-band management of the information handling system;
   a plurality of communications bus root complex ports; and
   a storage backplane having a plurality of slots configured to receive respective storage resources;
   wherein the information handling system is configured to:
   store, in a firmware of the management controller, an initial data structure containing, for each of a plurality of different potential information handling system configurations, a respective correspondence between the plurality of communications bus root complex ports and the plurality of slots for that potential information handling system configuration;
   transmit, from the BIOS to the management controller, information regarding bus numbers for a plurality of enumerated information handling resources coupled to the communications bus; and
   determine, by the management controller, a correspondence between the bus numbers and the plurality of slots, wherein the determining includes determining a particular one of the plurality of different potential information handling system configurations that corresponds to the information handling system and selecting a particular one of the respective correspondences based on the particular one of the plurality of different potential information handling system configurations, wherein the selecting is based on a backplane identifier associated with the storage backplane and a configuration identifier associated with a complex programmable logic device (CPLD) of the information handling system.

2. The information handling system of claim 1, wherein the communications bus is a Peripheral Component Interconnect Express (PCIe) bus.

3. The information handling system of claim 2, wherein the root complex ports include central processing unit (CPU) root complex ports and PCIe expander ports.

4. The information handling system of claim 1, further comprising a plurality of storage backplanes.

5. The information handling system of claim 1, wherein the initial data structure is stored in the firmware of the management controller during manufacturing of the information handling system.

6. A method comprising:
   in an information handling system comprising a basic input/output system (BIOS), a management controller configured to provide out-of-band management of the information handling system, a plurality of communications bus root complex ports, and a storage backplane having a plurality of slots configured to receive respective storage resources:
   storing, in a firmware of the management controller, an initial data structure containing for each of a plurality of different potential information handling system configurations, a respective correspondence between the plurality of communications bus root complex ports and the plurality of slots for that potential information handling system configuration;
   transmitting, from the BIOS to the management controller, information regarding bus numbers for a plurality of enumerated information handling resources coupled to the communications bus; and
   determining, by the management controller, a correspondence between the bus numbers and the plurality of slots, wherein the determining includes determining a particular one of the plurality of different potential information handling system configurations that corresponds to the information handling system and selecting a particular one of the respective correspondences based on the particular one of the plurality of different potential information handling system configurations, wherein the selecting is based on a backplane identifier associated with the storage backplane and a configuration identifier associated with a complex programmable logic device (CPLD) of the information handling system.

7. The method of claim 6, wherein the communications bus is a Peripheral Component Interconnect Express (PCIe) bus.

8. The method of claim 7, wherein the root complex ports include central processing unit (CPU) root complex ports and PCIe expander ports.

9. The method of claim 6, wherein the initial data structure is stored in the firmware of the management controller during manufacturing of the information handling system.

10. An article of manufacture comprising a non-transitory, computer-readable medium having computer-executable code thereon that is executable by a processor of a management controller of an information handling system for:
    reading, from a firmware of the management controller, an initial data structure containing, for each of a plurality of different potential information handling system configurations, a respective correspondence between a plurality of communications bus root complex ports of the information handling system and a plurality of slots of a storage backplane of that potential information handling system configuration;
    receiving, from a basic input/output system (BIOS) of the information handling system, information regarding bus numbers for a plurality of enumerated information handling resources coupled to the communications bus; and
    determining a correspondence between the bus numbers and the plurality of slots, wherein the determining includes determining a particular one of the plurality of different potential information handling system configurations that corresponds to the information handling system and selecting a particular one of the respective correspondences based on the particular one of the plurality of different potential information handling system configurations, wherein the selecting is based on a backplane identifier associated with the storage backplane and a configuration identifier associated with a complex programmable logic device (CPLD) of the information handling system.

11. The article of claim 10, wherein the communications bus is a Peripheral Component Interconnect Express (PCIe) bus.

12. The article of claim 11, wherein the root complex ports include central processing unit (CPU) root complex ports and PCIe expander ports.

13. The article of claim 10, wherein the information handling system includes a plurality of storage backplanes.

14. The article of claim 10, wherein the initial data structure is stored in the firmware of the management controller during manufacturing of the information handling system.

* * * * *